Oct. 10, 1950      C. F. FAIRCHILD      2,524,969
WELDER'S WORKHOLDER
Filed Oct. 3, 1947      3 Sheets-Sheet 1
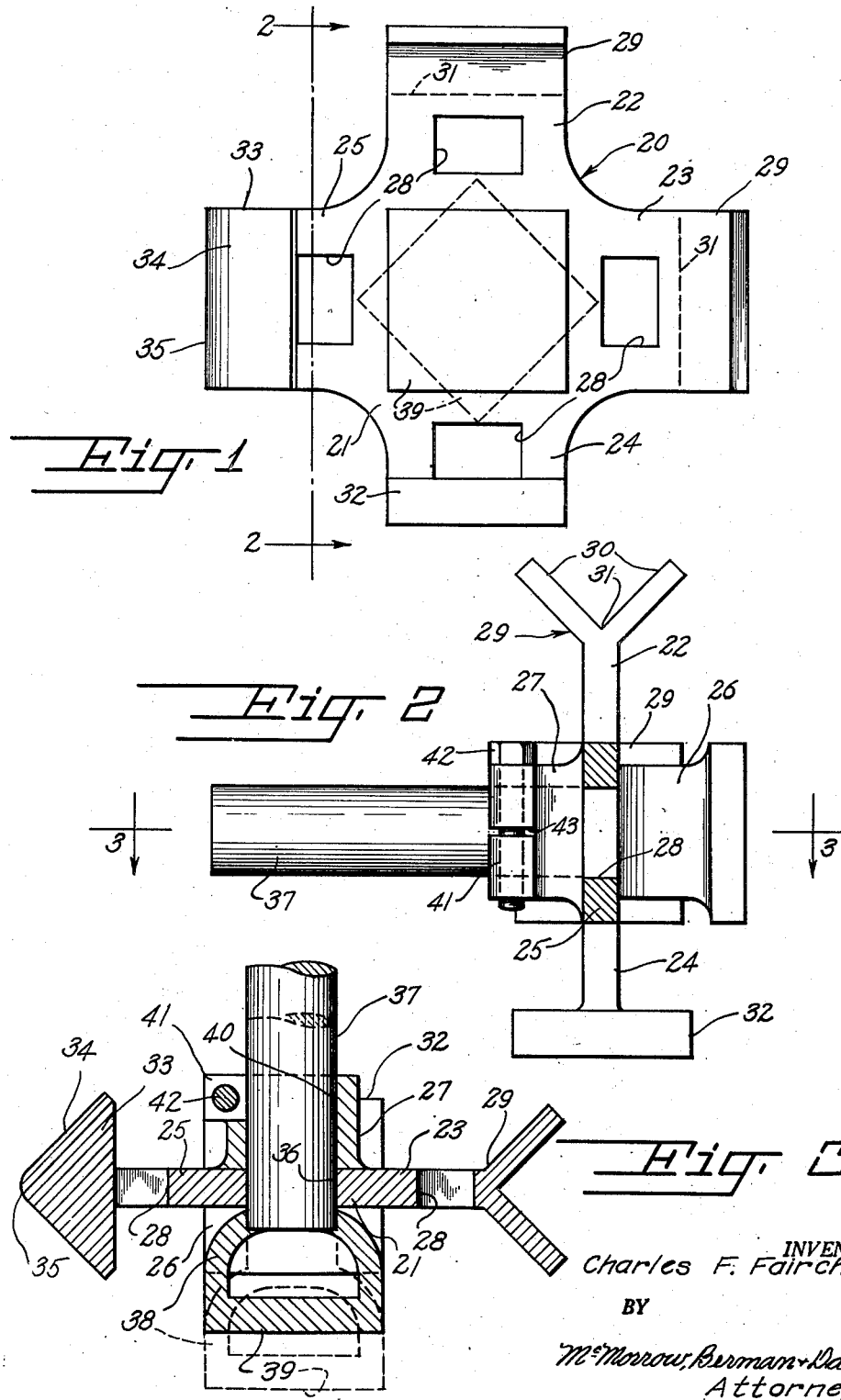
INVENTOR
Charles F. Fairchild
BY
McMorrow, Berman & Davidson
Attorneys

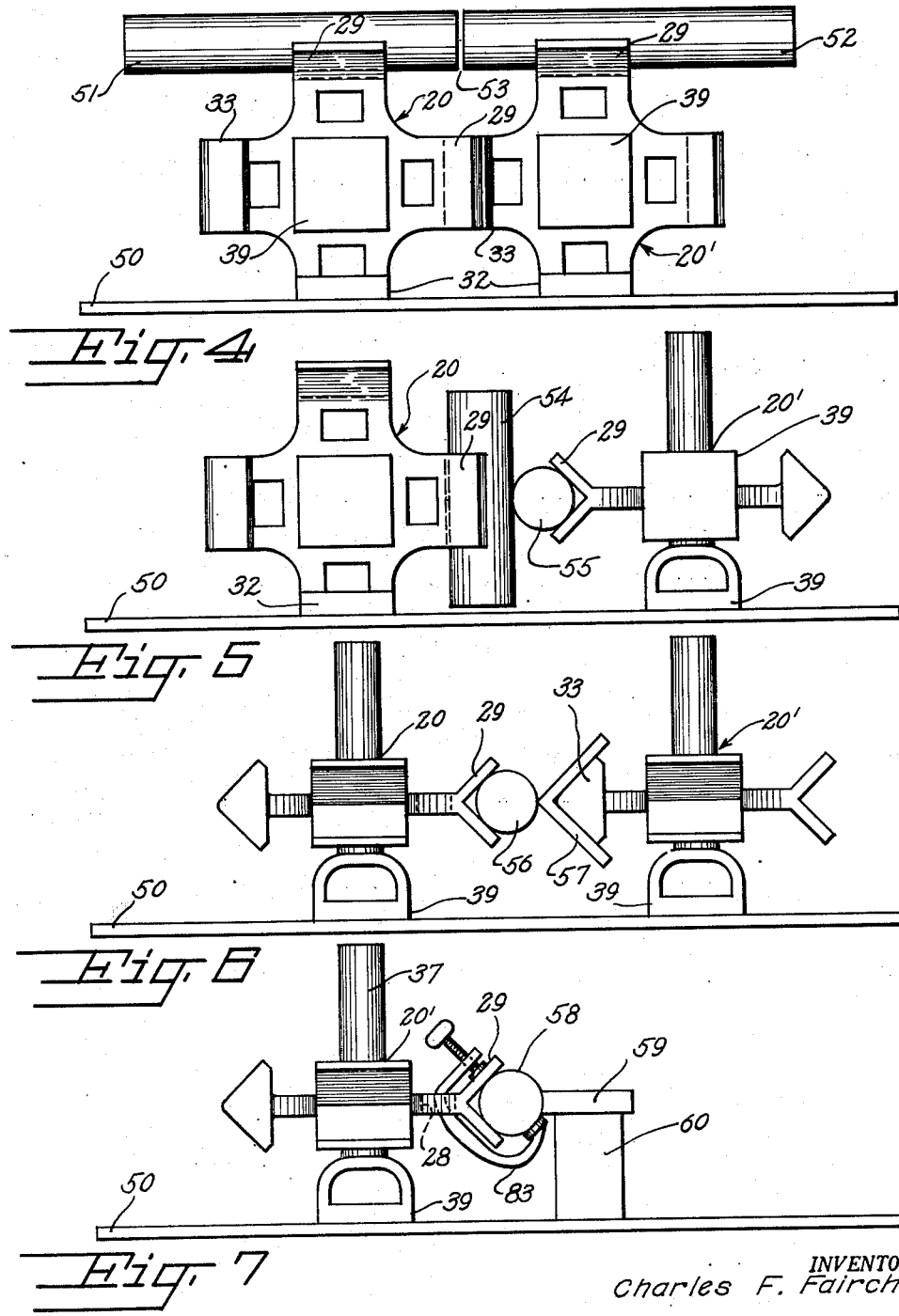

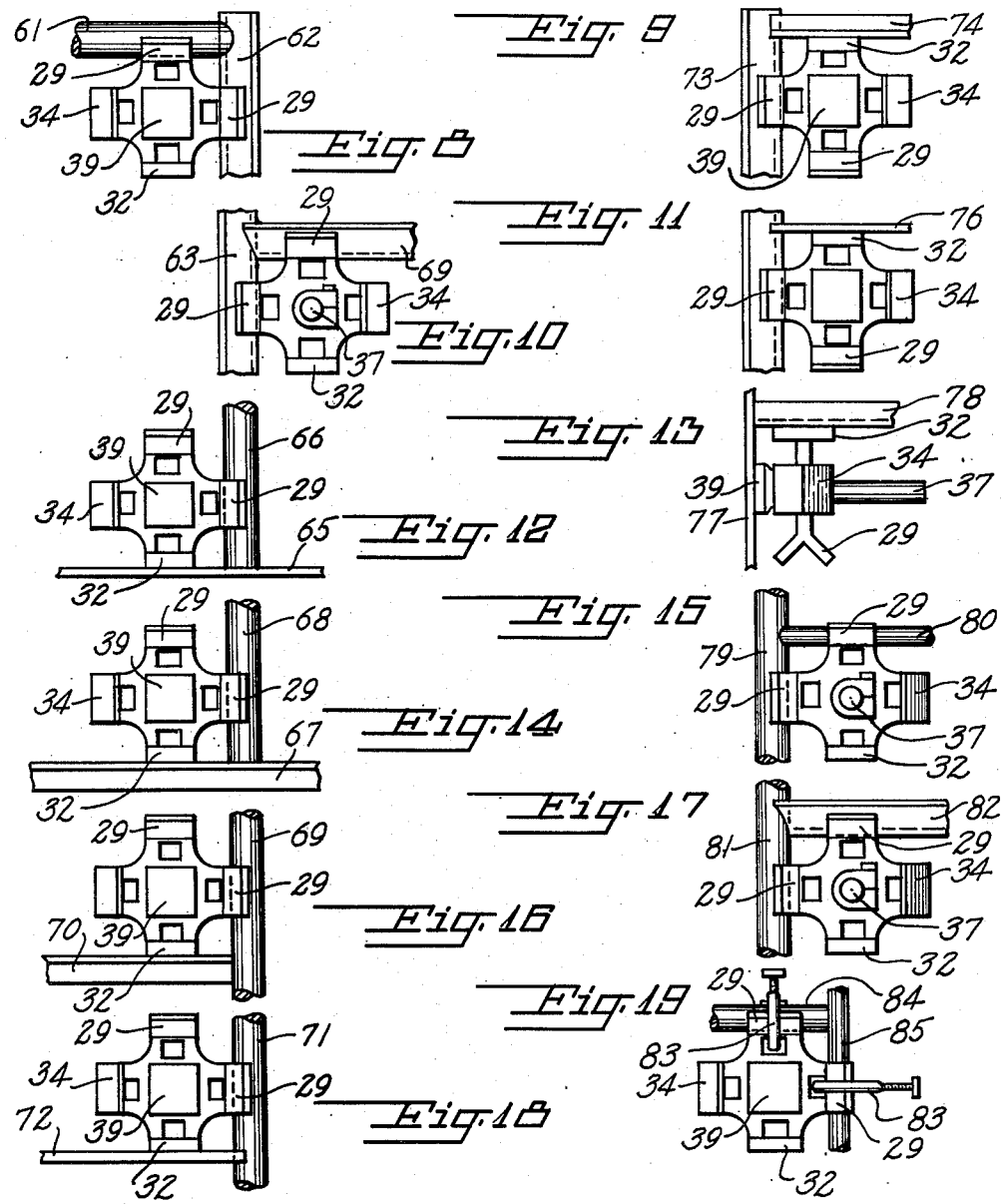

Patented Oct. 10, 1950

2,524,969

UNITED STATES PATENT OFFICE 2,524,969

WELDER'S WORK HOLDER

Charles F. Fairchild, Fulton, Mo.

Application October 3, 1947, Serial No. 777,756

2 Claims. (Cl. 113—99)

My invention relates to holders for holding at least one piece of work in proper relation to another work piece for welding the same together. It is particularly adapted for use when the work pieces are to be welded together in angular relation to each other.

In recent years great impetus has been given to the welding art by discovery of new tools, materials, fluxes, techniques and methods. As a result, more and more joints formerly made by bolting, riveting, or the like, are now made by welding, and numerous parts or structures formerly made of one piece of material by molding, machining, stamping, or the like are now made of simple and separate parts welded together with a resultant elimination of costly tools and much of the production costs of such structures. As a consequence, there has developed a real need for a work holder which is adapted to handle a large variety of work pieces for welding the same together in various relations to each other, and which is adapted to handle work pieces having a wide variety of cross-sectional shapes. Such a work holder would obviously eliminate the necessity for expensive jigs or like makeshift arrangements for supporting the work pieces in proper welding relation to each other.

With the foregoing in view, an object of my invention is to provide an improved work holder for welders.

A further object is to provide an improved work holder for welders capable of supporting at least two work pieces of one or more cross-sectional shapes in proper angular relation to each other.

A further object is to provide an improved work holder for welders capable of cooperative use with similar work holders for supporting at least two work pieces of one or more cross-sectional shapes in proper welding relation to each other.

A further object is to provide an improved work holder for welders which comprises a plurality of combined work supports and holder bases in angular relation to each other and which provides a holder capable of multi-positional use and which is adapted to handle a plurality of work pieces of different cross-sectional shapes.

Other objects and advantages reside in the particular structure of my invention, combination and arrangement of the several portions thereof, and/or in the particular method or mode of operation, all of which will be readily apparent to those skilled in the art upon reference to the attached drawings in connection with the following specification, wherein the invention is shown, described and claimed.

In the drawings:

Figure 1 is an elevation of a work holder according to the invention;

Figure 2 is a transverse vertical section taken substantially on the plane of the line 2—2 of Figure 1;

Figure 3 is a horizontal section taken substantially on the line 3—3 of Figure 2, but showing the device turned 90° in a clockwise direction on a horizontal axis;

Figures 4 to 19, inclusive, are elevations of one or more of the work holders according to the invention, showing various uses of the same.

Referring specifically to the drawings, wherein like reference characters have been used throughout to designate like parts, 20 designates generally a holder according to the invention and which comprises a central web 21 of substantially heavy gauge sheet metallic material from which extend at right angles to each other four arms 22, 23, 24, and 25. Each of the arms aforesaid is formed with a central aperture 28 therethrough for a purpose to be described later. Each of the outer free ends of the arms 22 and 23 has formed integrally therewith an elongated V-shaped support 29, each having converging sides 30 and an apex portion 31. The sides 30 preferably converge at substantially right angles to each other. The apices 31 of the supports 29 preferably lie in the plane of the web 21, but are at right angles to each other, as shown in Figure 1. The arm 24 has formed on the free end thereof at right angles to the plane thereof a flat plate 32. The arm 25 has formed on its free end a substantially wedge-shaped work support 33 which is formed with a pair of elongated converging sides 34 which converge in a substantially blunt apex 35. The base of the support 33 is attached to the free end of arm 25 so that the apex 35 lies substantially in the plane of the web 21 parallel to the apex 31 of one of the supports 29 but at right angles to the apex of the other of such supports.

The transverse axis of the web 21 of the support is provided with a transverse circular aperture 36 therethrough in which is slidably and rotatably mounted a cylindrical rod 37. The rod 37 extends through the aperture 36 and has formed on one end thereof, or integrally attached thereto in any suitable manner, a substantially inverted U-shaped web 38, the free ends of the legs of which are closed by a plate member 39. As is clearly indicated in Figure 1, such plate 39 lies at substantially right angles to the plate 32 of the arm 24. On the side of the web 21 opposite to the plate 39 there is provided an annular boss 27 which is integrally secured to the web 21 in any suitable manner and which is provided with an axial bore 40 corresponding in size to the bore 36 through the web and in axial alignment with such bore 36 to provide a continuation thereof and through which the rod 37 extends. The outer free end of the boss 27 is split, as at 43, to provide two opposed ears 41 which are transversely pierced by aligned apertures, at least one of which is interiorly threaded to receive a clamping bolt 42. This arrangement permits the rod 37 to be held in the aligned bores 40 and 36 in longitudinally extended and pivoted relation to the support, as is indicated in broken lines in Figures 1 and 3. The free end of the rod 37 extends axially well beyond the clamp 41 and provides a convenient handle for manipulating the holder. Also, such free end, as well as the supports 29, 32, 33 and 39, are adapted to be gripped in a bench vise, or the like, when necessary. This last may be especially necessary when work pieces are to be connected at angles other than right angles.

The uses of the device are many and varied, and it is obvious from the description heretofore that the holder 20 is capable of being supported on a flat surface by any of the portions 32, 29 or 39, whereby to provide a work piece support opposite to the supporting base which is horizontal thereto, and simultaneously to provide work piece supports perpendicular to such supporting base. By way of illustration, Figures 4 to 19, inclusive, illustrate various uses of the device, either alone or in combination with a similar or identical work holder. As shown in Figures 7 and 19, the apertures 28 formed through the arms of the web 21, as well as the aperture formed by the U-shaped web 38, are adapted to receive C-clamps 83, chains, wires, or like means for clamping the work pieces to the related work piece support.

In Figure 4, two holders 20 and 20' are arranged in end-to-end relation with the support 33 of one fitting into a complementary support 29 of the other holder, whereby to position the remaining two supports 29 uppermost and in alignment. Work pieces 51 and 52 of any suitable cross-section are supported in the aligned supports 29 in end-to-end relation for welding together at the abutting point 53. By reason of the complementary nature of the parts 33 and 29, correct alignment of the articles to be welded is readily achieved without special tools or implements.

In Figure 5, the holder 20 is positioned as in Figure 4 upon a suitable supporting surface 50 and stands on plate 32 as a base. However, the second holder 20' has been turned 180° on a vertical axis and 90° on a horizontal axis, whereby to be supported upon the base plate 39 thereof and to position a work support 29 opposite to a work support 29 of the holder 20, but at right angles thereto. This arrangement permits the holders 20 and 20' to support a pair of work pieces 54 and 55 at right angles to each other for welding at the abutting points thereof.

In Figure 6, both holders 20 and 20' are identically positioned on the bases 39 thereof, whereby a support 29 of the holder 20 is positioned horizontally in opposition to the support 33 of the holder 20', which is also positioned horizontally. The support 29 carries a work piece 56 which may be of round or cylindrical construction and in parallel abutting relation to the apex of an angular work piece 57 for welding at the abutting points thereof.

In Figure 7, there is illustrated the use of a single holder 20 in connection with a support 60 for a work piece 59 resting atop thereof, and wherein the support 29 has clamped therein by a C-clamp 83 a work piece 58 tangentially to the work piece 59. In this connection, any work piece support 60 may be utilized providing its height is not greater than the length of the rod 37, as it is a simple matter to loosen the clamp 41 and vertically adjust the web 21 on the rod 37 until the work piece 58 is correctly positioned relative to the work piece 59.

Figures 8 to 19, inclusive, show various ways in which a single holder may be used. For the sake of clarity, means for clamping the work to the holder has been omitted from all views save Figure 19. Also, only the abutting ends of the work piece have been shown, and it is to be understood that in most cases at least one of the work pieces is supported by means, not shown, such as a vise or a structure or framework of which such work piece is a part. Thus, the holder 20 is clamped to such substantially rigidly-supported work piece to support the holder while the second work piece, which is usually otherwise unsupported is clamped to the holder 20 for support. It follows, therefore, that a support such as the surface 50 of a welding bench or the like is not only unnecessary, but is usually not present except when relatively short and otherwise unsupported work pieces are both clamped to the holder 20 for support thereby.

In Figure 8, a holder 20 is arranged as is one of the holders 20 in Figure 4, but the adjacent work piece supports 29 thereof support respectively, as by being clamped thereto by any suitable clamps, not shown, a work piece 62 of angular cross-configuration, and a cylindrical work piece 61, whereby the work pieces 61 and 62 abut each other at right angles. One of the work pieces 61 or 62 may comprise a rigid integral part of a frame or other structure, or it may be supported in a bench vise or the like, not shown.

In Figure 9, the work holder 20 is clamped or otherwise supported by the flat base or support 32 on a work piece 74 of angular configuration, while the right hand or vertically-disposed support 29 has seated therein and secured thereto a second work piece 73, also of angular configuration.

In Figure 10, each of the work supports 29 has supported therein a work piece 63 and 69, both of which are of angular configuration.

In Figure 11, the work support 32 is seated upon and clamped to a work piece 76 which may be flat, while the adjacent and vertically-disposed work support 29 has seated therein and clamped thereto a work piece 75 of angular configuration.

Figure 12 shows a work piece 65 supported upon a horizontal surface, while a cylindrical work piece 66 is seated thereon and clamped to the vertically-disposed work support 29.

In the Figure 11 structure, it is contemplated that the work piece 75 would be an integral part of the machine or frame, or of such a length that it is necessary to support the same in a vise or otherwise above or away from a horizontal surface such as that at 50, of Figure 4.

In Figure 13, the flat work support 39 is clamped or otherwise secured to a substantially flat work piece 77, which is disposed vertically with a surface thereof in abutting relation to a channel-shaped work piece 78 which is clamped or otherwise secured to the flat base 32 of the holder 20.

In Figure 14, the base or support 32 of the work holder 20 is seated upon the work piece 67 of angular configuration, while the vertically-disposed work support 29 has clamped thereto a work piece 68 of cylindrical configuration. In this arrangement, it is intended that the work piece 67 is either an integral portion of a frame or structure, or is clamped in a vise.

In Figure 15, a pair of tubular or cylindrical work pieces 79 and 80 are secured to the adjacent work supports 29 so that one end of the horizontal work piece 80 may be welded to an intermediate point of the work piece 79.

Figure 16 is set up similar to Figure 14, but in this instance the vertically-disposed cylindrical work piece 69 is adapted to be clamped in a vise or the like for connection to the angular work piece 70 which is clamped to the flat support 32 of the holder 20.

In Figure 17, an angular work piece 82 is clamped to the horizontally-disposed work support 29 in abutting relation with a cylindrical work piece 81 which is clamped to the vertically-disposed support 29.

In Figure 18, the flat support 32 is secured to a flat work piece 72 which abuts a cylindrical work piece 71 clamped to the vertically-disposed work support 29.

Figure 19 shows the use of a single holder 20 which supports work pieces 84 and 85 in right-angled abutting relation. Each of the work pieces is carried by one of the supports 29 and both are clamped therein by C-clamps 83, or the like. Obviously, any two of the supports 29, 29, 32 or 39 could be used in this manner.

It is obvious from the foregoing that many other uses of the holders are possible, and that they are adapted for use with work pieces of cross-sectional configuration other than disclosed hereinbefore.

Also, while I have shown work holders operative individually and in pairs, it is obvious that three or more holders are capable of being used simultaneously to hold three or more work pieces for simultaneous welding or for supporting elongated or large work pieces. It is also obvious that while I have shown and described a particular form of work holder, the same is susceptible of other forms and embodiments. Consequently, I do not limit myself to the precise expressions shown hereinbefore, except as hereinafter claimed.

I claim:

1. A welder's work holder, comprising a flat web, four arms integral with said web and extending radially outwardly of the edges thereof in the plane of said web at 90° intervals, a flat plate-like support integrally connected to the free end of one arm and extending at right angles thereto, an elongated V-shaped support integrally connected by the apex thereof on the free ends of two of said arms with the plane of said web bisecting said supports in lengthwise directions, an elongated wedge-shaped support complementary to said V-shaped support integrally connected by its base on the free end of the remaining arm with the plane of said web bisecting the same lengthwise thereof, said web being formed with an aperture therethrough axially thereof, a rod slidable in said aperture and having free ends extending outwardly of either side of said web, a flat plate parallel to said web integral with at least one free end of said rod, and a clamp carried by said web and engageable with said rod to clamp the same in an adjusted position relative to said web.

2. A welder's work holder, comprising a flat web, four arms integral with said web and extending radially outwardly of the edges thereof in the plane of said web at 90° intervals, a flat plate-like support integrally connected to the free end of one arm and extending at right angles thereto, an elongated V-shaped support integrally connected by the apex thereof on the free ends of two of said arms with the plane of said web bisecting said supports in lengthwise directions, an elongated wedge-shaped support complementary to said V-shaped support integrally connected by its base on the free end of the remaining arm with the plane of said web bisecting the same lengthwise thereof, said web being formed with an aperture therethrough axially thereof, a rod slidable in said aperture and having free ends extending outwardly of either side of said web, a flat plate parallel to said web integral with at least one free end of said rod, a clamp carried by said web and engageable with said rod to clamp the same in an adjusted position relative to said web, and each of said arms being formed with an aperture therethrough adjacent the free end thereof, said last-named apertures being adapted for the passage therethrough of means for securing work pieces on said supports.

CHARLES F. FAIRCHILD.

REFERENCES CITED

The following references are of record in the file of this patent:

UNITED STATES PATENTS

| Number | Name | Date |
|---|---|---|
| D. 45,931 | Gilbert | June 16, 1914 |
| 399,406 | Holt | Mar. 12, 1889 |
| 571,402 | Schneider | Nov. 17, 1896 |
| 1,061,622 | Mellon | May 13, 1913 |
| 1,345,974 | Watts | July 6, 1920 |
| 1,517,439 | Like | Dec. 2, 1924 |
| 2,342,004 | Meyer | Feb. 15, 1944 |
| 2,355,072 | Honegger | Aug. 8, 1944 |